No. 686,196. Patented Nov. 5, 1901.
T. BENNETT.
VEHICLE SCALE.
(Application filed June 28, 1901.)
(No Model.) 2 Sheets—Sheet 1.
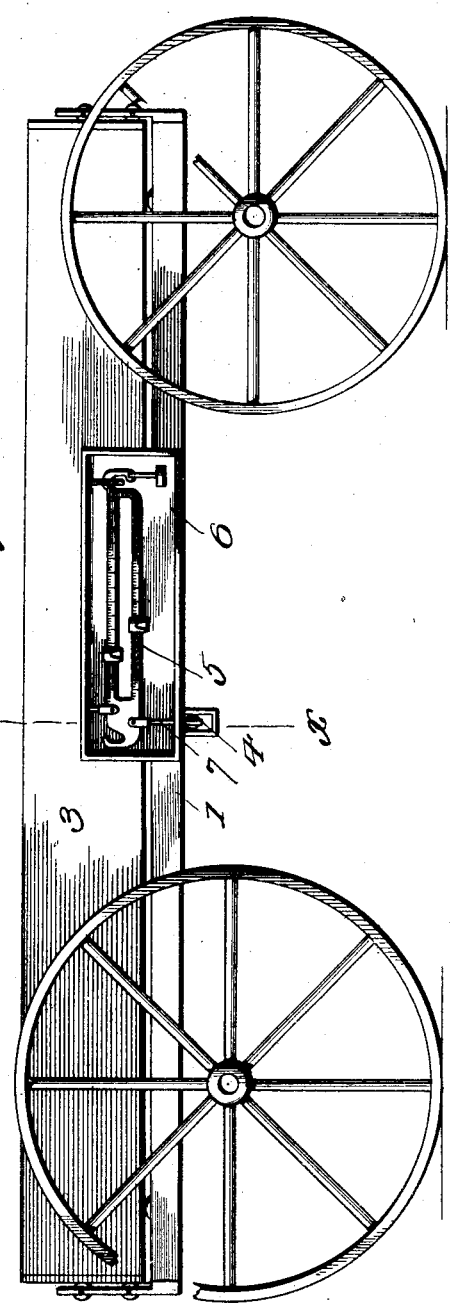
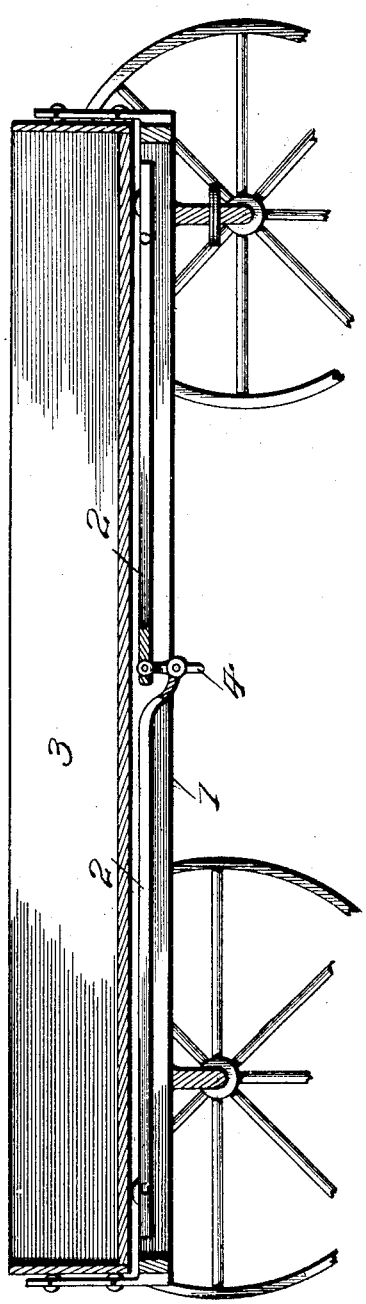
Witnesses
Jnr. Innie
Gladys L. Thompson
Inventor
T. Bennett
By
R. S. & A. B. Lacey
Attorneys
THE NORRIS PETERS CO., PHOTO-LITHO., WASHINGTON, D. C.

No. 686,196. Patented Nov. 5, 1901.
T. BENNETT.
VEHICLE SCALE.
(Application filed June 28, 1901.)
(No Model.) 2 Sheets—Sheet 2.
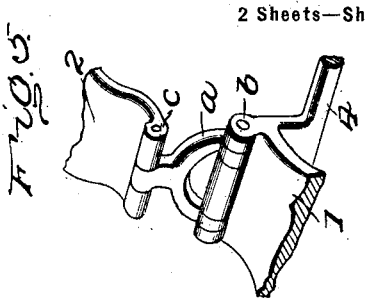
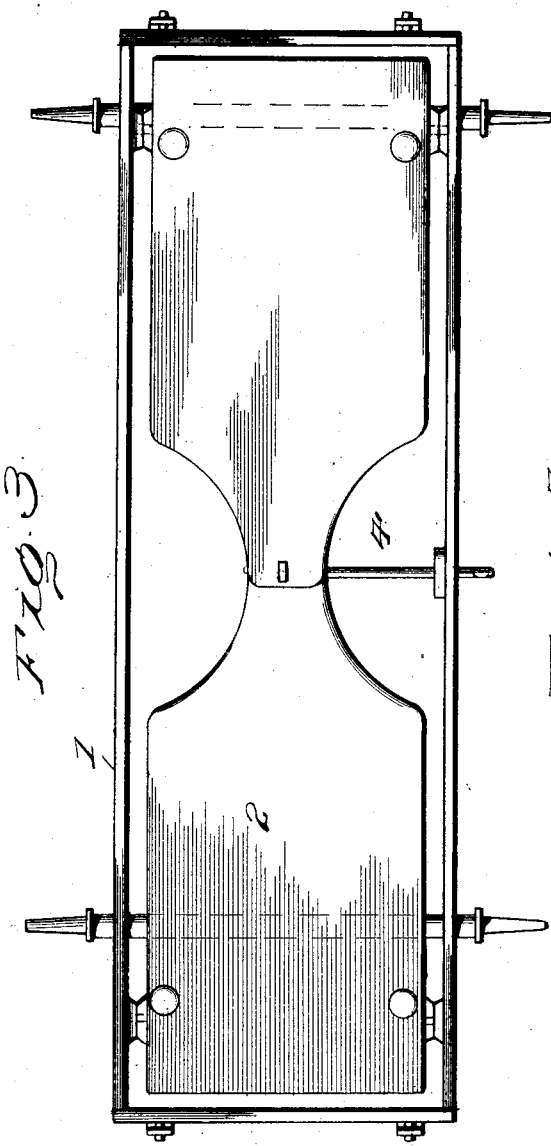
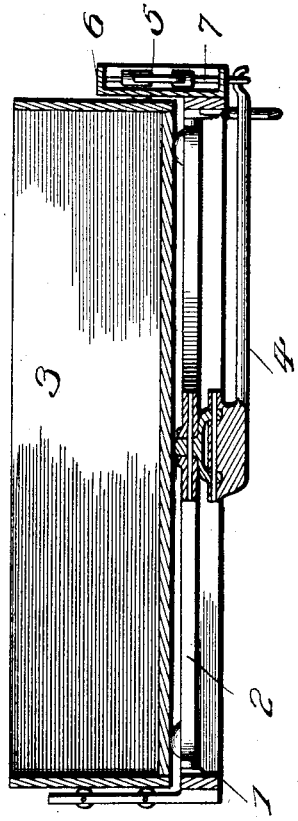
Witnesses
Inventor
T. Bennett
By
Attorneys

UNITED STATES PATENT OFFICE.

THOMAS BENNETT, OF WORTHINGTON, INDIANA.

VEHICLE-SCALE.

SPECIFICATION forming part of Letters Patent No. 686,196, dated November 5, 1901.

Application filed June 28, 1901. Serial No. 66,405. (No model.)

*To all whom it may concern:*

Be it known that I, THOMAS BENNETT, a citizen of the United States, residing at Worthington, in the county of Greene and State of Indiana, have invented certain new and useful Improvements in Vehicle-Scales; and I do hereby declare the following to be a full, clear, and exact description of the invention, such as will enable others skilled in the art to which it appertains to make and use the same.

This invention relates to a weighing mechanism which can be applied to any style of cart, wagon, or vehicle for weighing coal, grain, meat, vegetables, or any commodity to be weighed in barter.

The weighing mechanism is constructed so as to be readily applied to a vehicle or detached therefrom when required for use as an ordinary platform-scale.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of a wagon having a weighing-scale fitted thereto in accordance with this invention. Fig. 2 is a longitudinal section. Fig. 3 is a plan view of the frame and scale-levers detached from the wagon. Fig. 4 is a transverse section about on the line X X of Fig. 1. Fig. 5 is a perspective view of the contiguous ends of the scale-levers and arm, showing the shackle connection between them.

Corresponding and like parts are referred to in the following description and indicated in all the views of the drawings by the same reference characters.

The frame 1, supporting the scale-levers 2, is of rectangular formation and when in position constitutes the bed upon which the wagon-body 3 is mounted, said frame being attached to the running-gear of the vehicle in any desired way. The scale-levers 2 are pivoted near their outer ends to opposite end portions of the frame 1, and their inner ends are shackled to each other and to the arm 4 for transmitting a pulling force to the short arm of the scale-beam 5. The arm 4 is adapted for movement with the levers 1 and 2 and is formed with or connected to one of the levers, as 1, so as to obviate other support therefor. The shackle *a* is forked at its lower end and has eyes or knuckles at its ends to coöperate with knuckles *b* and *c* at the ends of the levers 1 and 2, pins pivotally connecting the matching knuckles by passing through openings therein. The wagon-body 3 is mounted upon the scale-levers near their pivot connections with the frame 1, the supports between the scale-levers and wagon-body being inside of the fulcrums of the scale-levers, whereby the weight of the wagon-body tends to depress the inner ends of the scale-levers and to exert a downpull upon the outer end of the arm 4. A casing 6 is attached to a side bar of the frame 1 and receives the scale-beam 5, and this casing is arranged to come between the front and rear wheels of the vehicle, and in the event of the weighing mechanism being applied to a cart the casing 6 may be located at any convenient point. A rod 7 connects the outer end of the arm 4 with the short arm of the scale-beam in the usual way common in platform-scales.

The parts are adjusted and proportioned so that when the wagon-body is unloaded the scale-beam 5 is equipoised, and any weight placed in the wagon-body may be readily determined by the sliding weights or other weights added to the barb of the scale-beam, as will be readily understood, thereby obviating the necessity for weighing the wagon when loaded and again when unloaded in order to determine the net weight of the commodity carried thereby. When the frame is disconnected from the running-gear of the vehicle, it can be used as in ordinary platform-scales, as will be readily comprehended.

Having thus described the invention, what is claimed as new is—

In combination with a vehicle running-gear, a frame fitted thereto, a scale-beam at one side of the frame, scale-levers having knuckles at their ends, a shackle having knuckles at its ends pivotally connected to the knuckles
5 of the respective scale-levers, and an arm in the plane of the shackle and integral with one of the scale-levers and extended laterally therefrom at a right angle and connected at its outer end with the said scale-beam, substantially as described. 10

In testimony whereof I affix my signature in presence of two witnesses.

THOMAS BENNETT. [L. S.]

Witnesses:
  Thos. G. Williams,
  Charles C. Adkins.